(12) United States Patent
Schild et al.

(10) Patent No.: US 10,833,624 B2
(45) Date of Patent: Nov. 10, 2020

(54) METHOD AND DEVICE FOR EXTERNAL MONITORING OF POWER ELECTRONICS

(71) Applicant: Robert Bosch GmbH, Stuttgart (DE)

(72) Inventors: Johannes Schild, Abstatt (DE); Wilfried Feuchter, Kupferzell (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/311,316

(22) PCT Filed: Apr. 25, 2017

(86) PCT No.: PCT/EP2017/059733
§ 371 (c)(1),
(2) Date: Dec. 19, 2018

(87) PCT Pub. No.: WO2018/001598
PCT Pub. Date: Jan. 4, 2018

(65) Prior Publication Data
US 2019/0190433 A1    Jun. 20, 2019

(30) Foreign Application Priority Data

Jun. 27, 2016   (DE) .......................... 10 2016 211 498

(51) Int. Cl.
*B60L 3/00*    (2019.01)
*B60L 3/04*    (2006.01)
(Continued)

(52) U.S. Cl.
CPC ............ *H02P 29/028* (2013.01); *B60L 3/003* (2013.01); *B60L 3/0084* (2013.01); *B60L 3/04* (2013.01);
(Continued)

(58) Field of Classification Search
CPC ........ H02P 29/028; B60L 3/04; B60L 15/007; B60L 3/003; B60L 3/0084;
(Continued)

(56) References Cited

U.S. PATENT DOCUMENTS 4,281,376 A    7/1981   Münchow et al.
9,067,615 B2 *  6/2015   Kashiwai ................ F16D 65/10
(Continued)

FOREIGN PATENT DOCUMENTS

CH    649179    4/1985
EP    0588628   3/1994
(Continued)

OTHER PUBLICATIONS

International Search Report for Application No. PCT/EP2017/059733 dated Aug. 4, 2017 (English Translation, 2 pages).
(Continued)

*Primary Examiner* — Christopher P McAndrew
(74) *Attorney, Agent, or Firm* — Michael Best & Friedrich LLP

(57) ABSTRACT

The invention relates to a method (300) for external monitoring of power electronics (450), wherein the power electronics (450) are actuated by means of first control electronics (460) and the method (300) is carried out by independent, second control electronics (420). The method comprises the following steps: determining (320) a parameter (P); determining (330) the difference (D) of between the determined parameter (P) and a target value (S); actuating (340) the power electronics (450) if the amount of the difference (D) exceeds a threshold (G).

14 Claims, 2 Drawing Sheets

(51) Int. Cl.
*B60L 15/00* (2006.01)
*H02P 29/028* (2016.01)
*H02M 7/48* (2007.01)

(52) U.S. Cl.
CPC ............ *B60L 15/007* (2013.01); *H02M 7/48* (2013.01); *B60L 2210/10* (2013.01); *B60L 2210/40* (2013.01); *B60L 2240/526* (2013.01); *B60L 2240/527* (2013.01); *B60L 2240/529* (2013.01); *Y02T 10/72* (2013.01)

(58) Field of Classification Search
CPC ......... B60L 2240/526; B60L 2240/527; B60L 2210/10; B60L 2240/529; B60L 2210/40; H02M 7/48; Y02T 10/7216; Y02T 10/7241
USPC ........................................................ 324/512
See application file for complete search history.

(56) References Cited

U.S. PATENT DOCUMENTS

| 2007/0070667 | A1  | 3/2007 | Stancu et al. |
| 2012/0221183 | A1* | 8/2012 | Wu ................... B60L 15/20 701/22 |
| 2013/0002179 | A1* | 1/2013 | Ozaki ................. B60L 3/003 318/400.21 |
| 2016/0149534 | A1  | 5/2016 | Guo et al. |

FOREIGN PATENT DOCUMENTS

| EP | 2554426 | | 2/2013 |
| EP | 2675060 | A1 | 12/2013 |

OTHER PUBLICATIONS

Wikipedia, "Electric Vehicle," May 21, 2016, Retrieved from the Internet on Jun. 21, 2016 <URL: https://en.wikipedia.org/w/index.php?title=Electric_vehicle&oldid=726284983>.

* cited by examiner

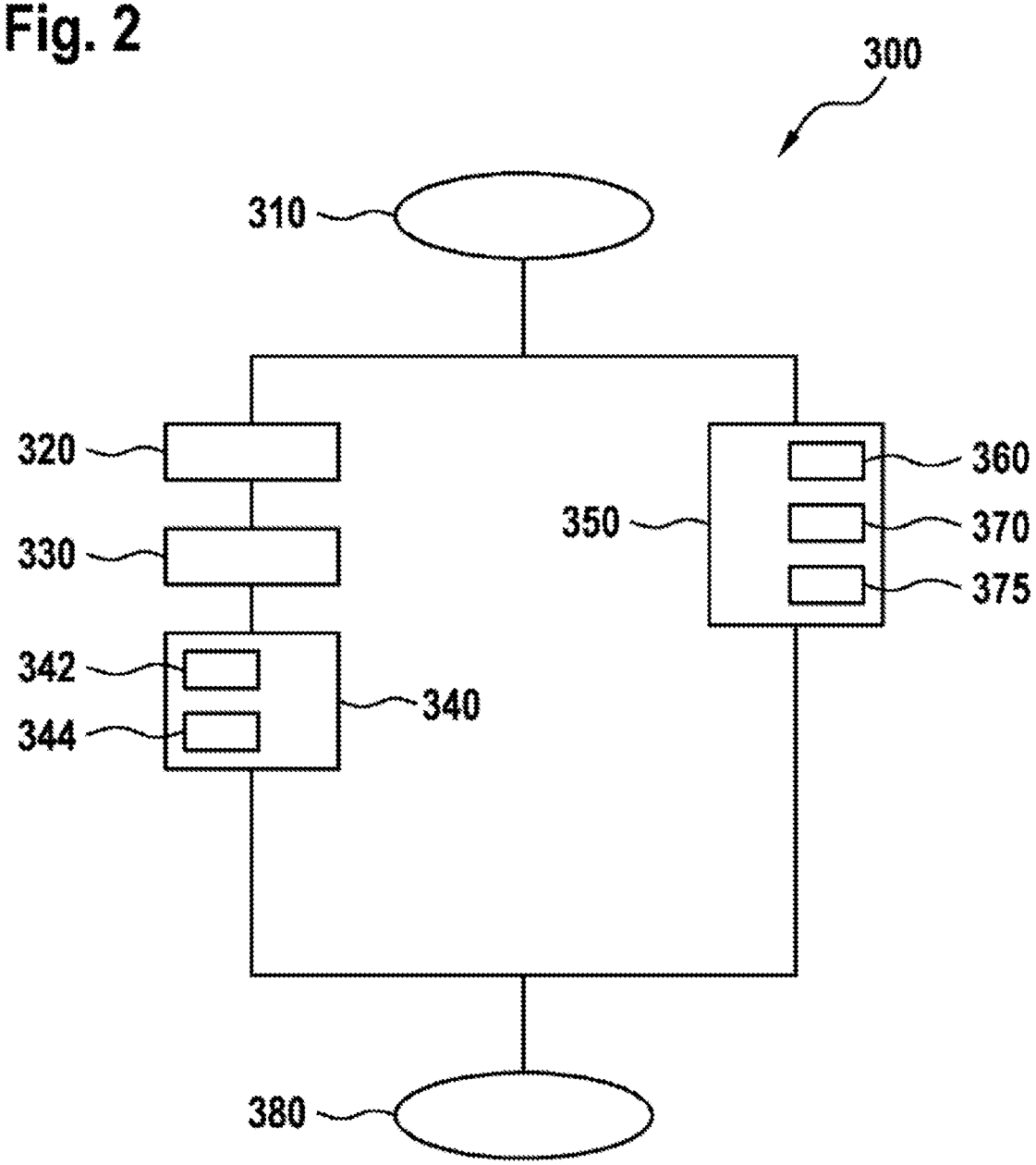

METHOD AND DEVICE FOR EXTERNAL MONITORING OF POWER ELECTRONICS

BACKGROUND OF THE INVENTION

The invention relates to a method and a device for external monitoring of power electronics. The invention further relates to a drivetrain with a corresponding device and to a vehicle with a drivetrain, as well as to a computer program and a machine-readable storage medium.

In vehicles with an electric drivetrain, an electric machine is supplied with electrical energy from an energy source by means of an inverter. Electricity from a DC voltage source is converted here by means of the inverter into a polyphase voltage for supply of the electric machine. A behavior and functioning of the inverter that is in accordance with specifications is necessary for safe operation of the electric drivetrain. A faulty behavior of an inverter can be very dangerous, since, for example, a vehicle could thereby unintentionally accelerate. There is therefore a need for monitoring power electronics or power-electronic assemblies of an electric drivetrain.

SUMMARY OF THE INVENTION

A method for external monitoring of power electronics is provided. The power electronics are driven by means of first control electronics. The method for external monitoring is carried out by independent, second control electronics. The method comprises the following steps: determining a parameter; determining the difference between the determined parameter and a target value and actuating the power electronics if the difference exceeds a threshold value.

A method for external monitoring of power electronics is provided. First control electronics are provided for actuation of the power electronics to be monitored. The method for external monitoring of the power electronics is carried out by independent, second control electronics. The method comprises a plurality of steps. A parameter is first determined. This parameter is, in particular an output parameter of the power electronics, for example a current or a voltage, which is transferred or output by means of the power electronics. The parameter can also be a parameter that is correlated to the behavior or the functionality of the power electronics. The parameter can thus, for example, be the behavior of a consuming unit that is supplied by means of the power electronics, for example its power consumption or energy output. The difference between the determined parameter and a target value is further determined. The target value is a value depending on which the control electronics actuate the power electronics in such a way that this target value is met. The target value and the parameter are supplied to the second control electronics. The second control electronics monitor the behavior of the power electronics by means of the determination of the difference between the parameter and the target value. The power electronics are actuated by the second control electronics if the magnitude of the difference exceeds a threshold value, in particular exceeds a specifiable threshold value. The second control electronics thus react to a faulty behavior or a behavior of the power electronics that is not in accordance with the specifications. A method for external monitoring of power electronics is advantageously provided.

In another embodiment of the invention, the step of actuation of the power electronics comprises the specification of a control requirement to the first control electronics.

As a reaction to the faulty behavior of the power electronics, the second control electronics specify a control requirement to the first control electronics. The control requirement can, for example, comprise the specification of a torque to the power electronics, for example a torque of zero. A control requirement can also be a requirement on the first control electronics to place the power electronics in a safe state. The power electronics, in particular, no longer present any danger in this safe state. Advantageously a possibility of reacting to the establishment of a faulty behavior of the power electronics is provided.

In another embodiment of the invention, the control requirement is specified by means of a bus message, in particular by means of a CAN bus message to the first control electronics. Advantageously, no additional communication means are necessary if communication possibilities that already exist are used for the control requirement.

In another embodiment of the invention, the step of actuating the power electronics comprises, in addition, the switching off of the power electronics if the specified control requirement is implemented incorrectly, in particular not at all.

The actuation of the power electronics is arranged in two stages, and comprises a full switching off of the power electronics for the case in which the initially specified control requirement of the second control electronics is implemented incorrectly by the power electronics. A two-stage method is advantageously provided as a reaction to an incorrect behavior of the power electronics.

In another embodiment of the invention, a testing of the method comprises the steps of: switching off the power electronics and receiving a signal from the first control electronics as a reaction to the switch-off.

The monitoring of power electronics is relevant for the safety of the operation of the power electronics. Method steps for testing the monitoring method are therefore provided. The power electronics are initially switched off by means of the second control electronics. A corresponding signal is subsequently received from the first control electronics as a reaction to the switch-off. If the signal from the first control electronics is not received within a specifiable period of time, the power electronics remain permanently switched off. A method for testing the monitoring method is advantageously provided.

In another embodiment of the invention, the switching off of the power electronics comprises switching the "enable line" of the power electronics to "low".

The power electronics comprise a so-called "enable line", in particular an electrical connection. Only if the level of the "enable line" is "high" is operation of the output stages of the power electronics possible. The level of the "enable line" is, in particular, "high" if an applied voltage exceeds a first threshold value. If the level of the "enable line" is "low" energy cannot flow through the output stages of the power electronics. The level of the "enable line" is, in particular, "low" if an applied voltage falls below a second threshold value, where the second threshold value is lower than the first threshold value. Switching the power electronics off therefore comprises switching the "enable line" of the power electronics to "low" by means of the second control electronics. An effective possibility for switching off the power electronics is advantageously provided.

In another embodiment of the invention, the first control electronics are assigned to the power electronics, or the first control electronics and the power electronics are arranged together inside one housing.

The first control electronics are assigned to the power electronics in such a way that the first control electronics actuate the drivers of the output stages of the power electronics during operation of the power electronics. It is appropriate for this purpose to arrange the control electronics and the power electronics together inside one housing. An advantageous topology for the interaction of the first control electronics and the power electronics is provided.

In another embodiment of the invention, the power electronics are designed as an inverter or as a DC converter.

Power-electronics assemblies, inverters or DC converters, for example, are present in electric drivetrains. They serve on the one hand for the conversion of the electrical energy of an energy source into a polyphase voltage for the supply of an electric drive aggregate, for example an electric machine, or, on the other hand, for the conversion, for example, of a high voltage of the energy source to a low voltage for the supply of control devices or other consuming units of the electric drivetrain. A method for external monitoring of an inverter or a DC converter is advantageously provided.

In another embodiment of the invention, the second control electronics are assigned to a control device, or the second control electronics are arranged inside a housing of the control device. The control device is always inherently safe and independent of the power electronics.

The second control electronics for carrying out the method serves for the control of a control device, for example a vehicle control unit (VCU) or an engine control unit (ECU) or another control device. The control electronics can be arranged inside a housing of the control device for this purpose. The control device to which the second control electronics are assigned is independent of the power electronics. For this reason, the control device is, in particular, independently capable of autonomous function. The operation of the control device is not necessarily dependent on the operation of the power electronics. This does not, however, exclude the possibility that, for example, communication is possible between the control device and the power electronics, for example via a connecting cable or an "enable line". The control device is, furthermore, inherently safe. This control device therefore comprises methods and means, for example a second microprocessor, in order to monitor the control device independently. An efficient topology for the second control electronics for carrying out the method for monitoring power electronics is advantageously provided.

The invention further relates to a computer program that is designed to carry out the method described above.

The invention further relates to a machine-readable storage medium on which the computer program described is stored.

The invention further relates to a device for external monitoring of power electronics. The power electronics are driven by means of first control electronics. The device comprises independent, second control electronics. The second control electronics are designed to determine a parameter, to determine a difference between the determined parameter and a target value, and to actuate the power electronics if the magnitude of the difference exceeds a threshold value.

A device for external monitoring of power electronics is provided. First control electronics are provided for actuation of the power electronics to be monitored. The apparatus for external monitoring of power electronics comprises independent, second control electronics. The second control electronics serve for the determination of a parameter. The second control electronics further determine a difference between the determined parameter and a target value. The power electronics are actuated by the second control electronics if the magnitude of the difference exceeds a threshold value. The second control electronics thus react to a faulty behavior or a behavior of the power electronics that is not in accordance with the specifications. A device for external monitoring of power electronics is advantageously provided.

The invention further relates to a drivetrain with a device as described, power electronics, first control electronics and an electric machine or an energy source.

Such a drivetrain serves, for example, the drive of an electric vehicle. In particular it comprises an energy source or battery, a DC voltage converter, an inverter and/or an electric machine that can be connected thereto. Safe operation of the drivetrain is enabled by means of the method and the device.

The invention further relates to a vehicle with a drivetrain as described. A vehicle is thus advantageously provided which comprises a device for external monitoring of power electronics.

It is clear that the features, properties and advantages of the method according to the invention are correspondingly relevant or applicable to the device or the drivetrain and the vehicle, and vice versa.

Further features and advantages of embodiments of the invention emerge from the following description with reference to the appended drawings.

BRIEF DESCRIPTION OF THE DRAWINGS

The invention is to be explained in more detail below with reference to some figures.

Here:

FIG. 2 shows a schematically illustrated method for external monitoring of power electronics.

DETAILED DESCRIPTION

Figure 1:
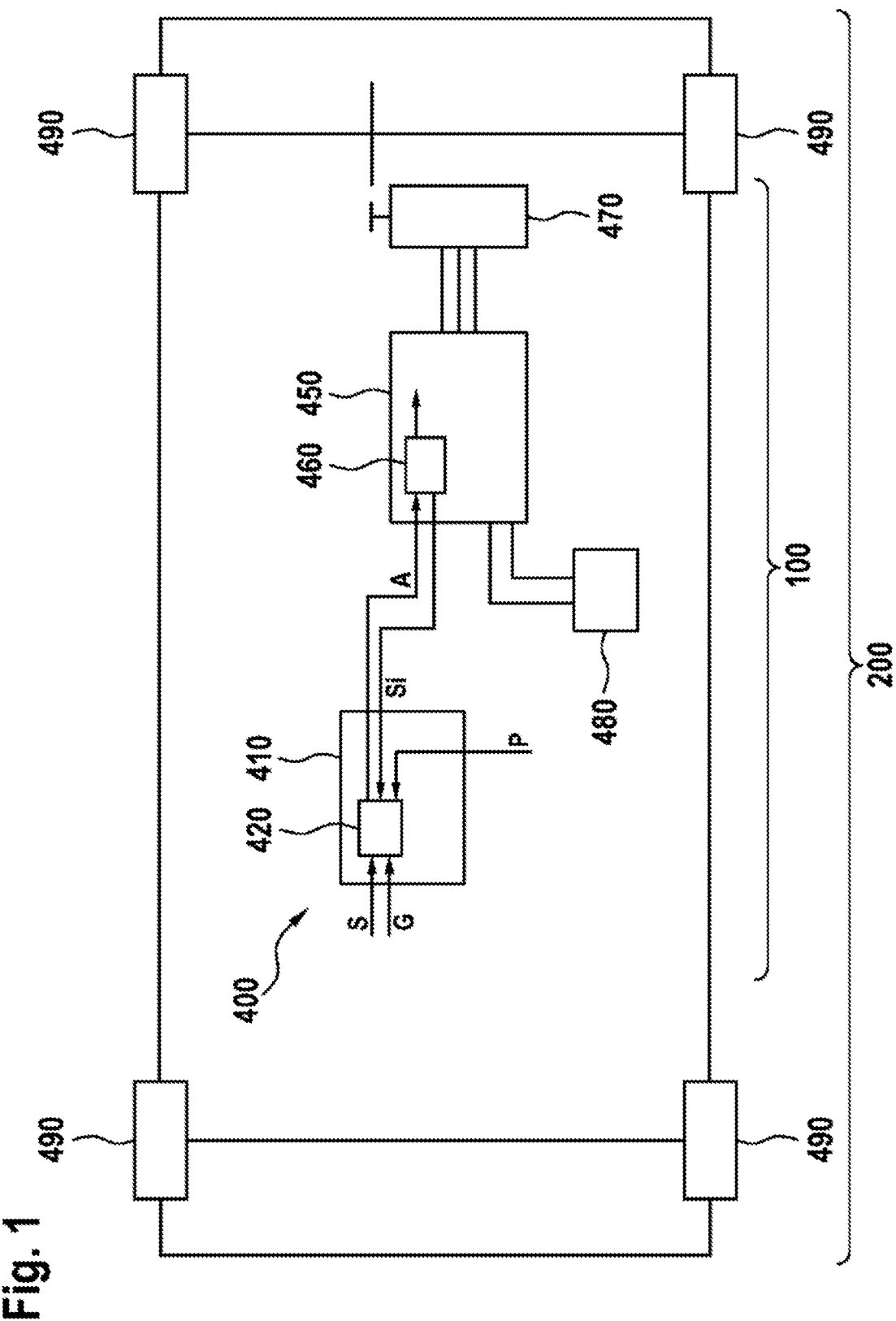
FIG. 1 shows a schematically illustrated vehicle with a drivetrain and a device.

FIG. 1 shows a schematically illustrated vehicle 200 with four wheels 490. This type and topology of the vehicle is only exemplary. Vehicles with two or multiple wheels on land, or other vehicles in the water or the air, are equally conceivable. The vehicle 200 comprises a drivetrain 100 which comprises the device 400, power electronics 450 with first control electronics 460, and an electric machine 470, or an energy source, for example a high-voltage battery 480. The power electronics 450 are controlled by means of first control electronics 460, and for example convert the energy of the energy source 480 into a polyphase alternating voltage for the supply of the electric machine 470. The electric machine 470 is provided, for example, for the drive of the vehicle 200. The apparatus 400 for external monitoring of the power electronics 450 comprises independent, second control electronics 420. The second control electronics 420 are arranged, by way of example, inside the control device 410. The second control electronics 420 are designed to determine a parameter P and a difference D between the determined parameter P and a target value S. If the magnitude of the difference D exceeds a threshold value G, the second control electronics 420 control the power electronics 450 in that they specify a control requirement A to the power electronics 450 or to their assigned first control electronics 460. The transfer of the control requirement A, or indeed the entire communication between the components, can take place, for example, wirelessly, via wires, or over a bus system. If the control requirement A is implemented incorrectly, or not at all, the second control electronics 420 switch the power electronics 450 off. The recognition of the incorrect implementation, or absent implementation, of the control requirement A can, for example, take place through a new determination of the parameter P and the determination of the difference between the parameter P and the target value S, which in this case corresponds to the control requirement A. The specifiable threshold value G can be applied depending on the parameter P and target value S that are used and determined. In order to test the device 400 and the method 300 for external monitoring of power electronics 450, the control device 410 or the second control electronics 420 set the "enable line" of the power electronics 450 and/or of the first control electronics 460 to "low", for example at the end of operation, after the vehicle has been shut down. The final stages of the power electronics 450 are thereby deactivated. The second control electronics 460 recognize this state through the final stage diagnosis of the power electronics 450, and report this state back to the second control electronics 420 by means of the signal Si. A successful switching off and functioning of the power electronics 450 is thus recognized by the second control electronics 420. If the signal Si fails to appear, the second control electronics 420 recognize a faulty power electronics 450, and cause it to be switched off permanently. The "enable line" of the power electronics 450 and/or the first control electronics 460 is set permanently to "low" for this purpose by the control device 410 or the second control electronics 420.

FIG. 2 shows a schematically illustrated method 300 for external monitoring of power electronics 450. The method begins with step 310, and then branches into the monitoring cycle with the steps 320, 330, 340, or into the test cycle with step 350. The method ends with step 380. The monitoring cycle begins with the determination of a parameter P in step 320. The difference between the determined parameter P and a target value S is determined in step 330. The power electronics 450 are actuated in step 340 if the magnitude of the difference D is greater than a threshold value G. Step 340 comprises, with step 342, the specification of a control requirement A to the first control electronics 460 if the magnitude of the difference D is greater than the threshold value G. The step of actuation 340 further comprises, with step 344, the switching off of the power electronics 450 if the specified control requirement A from step 342 is implemented incorrectly. The test cycle 350 comprises the steps of switching off 360 the power electronics 450. A signal Si is received from the first control electronics 460 as a reaction to the switch-off in step 370. If the signal Si fails to appear, the power electronics 450 are switched off permanently in step 375.

The invention claimed is:

1. A method (300) for external monitoring of power electronics (450), wherein the power electronics (450) are actuated by a first control electronics (460) and the method (300) is carried out by independent, second control electronics (420), having the steps of:
   determining (320) a parameter (P);
   determining (330) the difference (D) between the determined parameter (P) and a target value (S);
   actuating (340) the power electronics (450) if the amount of the difference (D) exceeds a threshold (G);
   wherein the step of actuation (340) of the power electronics (450) comprises a specification (342) of a control requirement (A) value for the first control electronics (460).

2. The method as claimed in claim 1, wherein the control requirement (A) is specified to the first control electronics (460) by a bus message.

3. The method as claimed in claim 1, wherein the step of actuation (340) of the power electronics (450) comprises the switching off (344) of the power electronics (450) if the specified control requirement (A) is incorrectly implemented.

4. The method as claimed in claim 1, wherein testing (350) the method comprises:
   switching off (360) the power electronics (450) and receiving (370) a signal (Si) from the first control electronics (460) as a reaction to the switch-off (360).

5. The method as claimed in claim 4, wherein the switching off (344), (360) of the power electronics (450) comprises switching an enable line of the power electronics to low.

6. The method as claimed in claim 1, wherein the first control electronics (460) are assigned to the power electronics (450).

7. The method as claimed in claim 1, wherein the power electronics (450) are an inverter or a DC voltage converter.

8. The method as claimed in claim 1, wherein the second control electronics (420) are assigned to a control device (410), wherein the control device (410) is independent of the power electronics (450).

9. The method as claimed in claim 1, wherein the first control electronics (460) and the power electronics (450) are arranged together inside one housing.

10. The method as claimed in claim 1, wherein the second control electronics (420) are arranged inside a housing of the control device (410), wherein the control device (410) is independent of the power electronics (450).

11. A system for external monitoring of power electronics (450), wherein the power electronics (450) are actuated by a first control electronics (460), wherein the system comprises an independent second control electronics (420) configured to:
   determine (320) a parameter (P);
   determine (330) the difference (D) between the determined parameter (P) and a target value (S);
   actuate (340) the power electronics (450) if the amount of the difference (D) exceeds a threshold (G);
   wherein the actuation of the power electronics (450) comprises a specification (342) of a control requirement (A) value for the first control electronics (460).

12. A device (400) for external monitoring of power electronics (450), wherein the power electronics (450) are actuated by a first control electronics (460), wherein the device (400) comprises an independent second control electronics (420) that are configured to determine a parameter (P), a difference (D) between the determined parameter (P) and a target value (S), and to actuate the power electronics (450) if the magnitude of the difference (D) exceeds a threshold value (G) wherein actuating the power electronics (450) comprises a specification (342) of a control requirement (A) value for the first control electronics (460).

13. The device (400) as claimed in claim 12, wherein the device (400) is part of a drivetrain (100).

14. The device (400) as claimed in claim 13, wherein the drivetrain (100) is part of a vehicle (200).

* * * * *